United States Patent [19]

Blake

[11] 4,199,923
[45] Apr. 29, 1980

[54] APPARATUS FOR CUTTING AND COLLECTING GRASS CLIPPINGS

[75] Inventor: Duane Blake, Fairfield, Calif.

[73] Assignee: Warren's Turf Nursery, Suisun City, Calif.

[21] Appl. No.: 969,623

[22] Filed: Dec. 14, 1978

[51] Int. Cl.$^2$ ...................... A01D 75/30; A01D 35/24
[52] U.S. Cl. ...................................... 56/14.5; 56/16.6
[58] Field of Search ...................... 56/14.5, 16.6, 16.4, 56/7, 6, 156, 157, 13.9

[56] References Cited

U.S. PATENT DOCUMENTS

| | | | |
|---|---|---|---|
| 865,161 | 9/1907 | Coldwell | 56/16.6 |
| 1,248,382 | 11/1917 | Neuman | 56/156 |
| 2,632,989 | 3/1953 | Ross | 56/14.5 |
| 2,947,571 | 8/1960 | Hagen | 56/16.6 |
| 4,103,477 | 8/1978 | Mollet et al. | 56/14.5 |

FOREIGN PATENT DOCUMENTS

| | | | |
|---|---|---|---|
| 1092454 | 4/1955 | France | 56/14.5 |
| 217656 | 6/1924 | United Kingdom | 56/14.5 |
| 1449742 | 9/1976 | United Kingdom | 56/13.9 |

*Primary Examiner*—Russell R. Kinsey
*Assistant Examiner*—Paul J. Hirsch

[57] ABSTRACT

An apparatus for mechanized harvesting of grass clippings comprises a vehicle with a T-shaped hydraulically driven extension platform for cutting and recovering grass clippings. The extension platform has a central arm with a lateral arm at the end thereof. A plurality of horizontally disposed reel-type scissor mower heads are mounted on the front and rear sides of the lateral arm, the outlets of the mower heads being directed into a horizontal trough within the lateral arm. The mower heads are operative to cut the grass and to throw the clippings into the trough. Within the trough are provided endless chains on pulleys to which are mounted spaced paddles which are operative to accumulate the grass clippings toward a central opening to a central trough within the central arm. Within the central trough are provided a plurality of endless chains and pulleys to which are mounted spaced paddles. The central trough's spaced paddles are operative synchronously with the horizontal trough paddles to convey accumulated clippings upwardly through a discharge port and a flexible chute to a dispensing bin. Within the dispensing bin there are provided a plurality of paddle blades mounted to a horizontally disposed drive shaft. The paddle blades are operative to moving the clippings from the bin to a hopper, from which the grass cuttings are dumped into a receiving vehicle such as a truck. The extension platform can be remotely raised and lowered around a horizontal pivot shaft adjacent the discharge port. Propulsion of the platform is provided through a pair of hydraulic cylinders mounted in parallel to a tilted pair of extensible rails and support cylinders, the cylinders being pivotally connected at one end to the vehicle frame and at the other end to a cradle from which the lateral arm is suspended.

11 Claims, 4 Drawing Figures

U.S. Patent  Apr. 29, 1980  Sheet 1 of 3  4,199,923
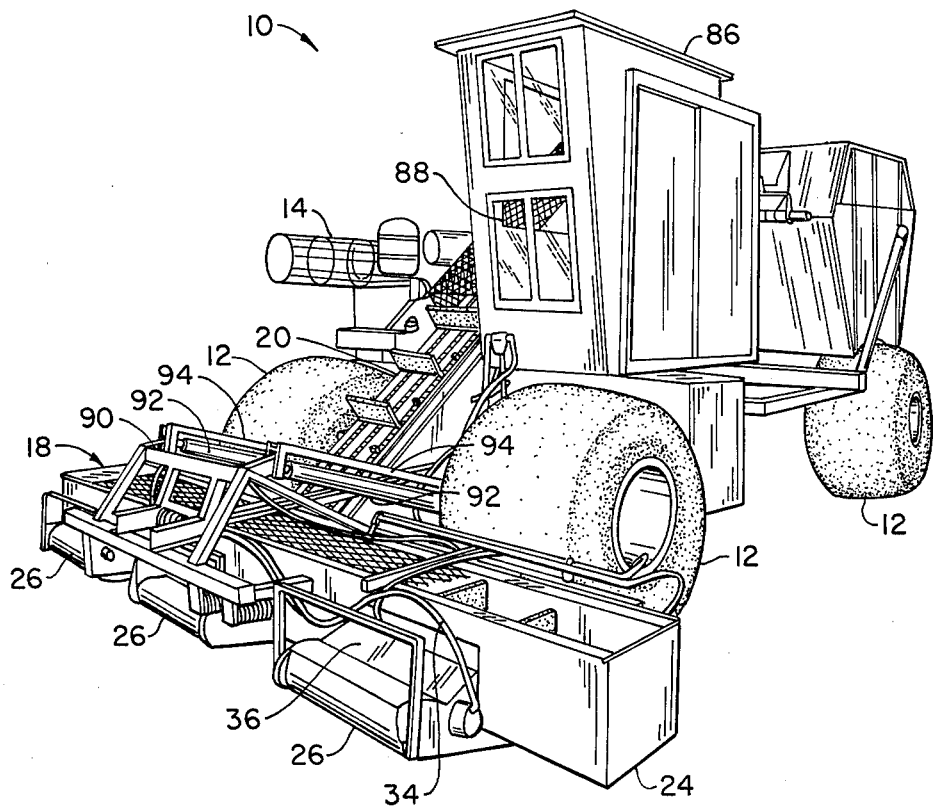
FIG._1.
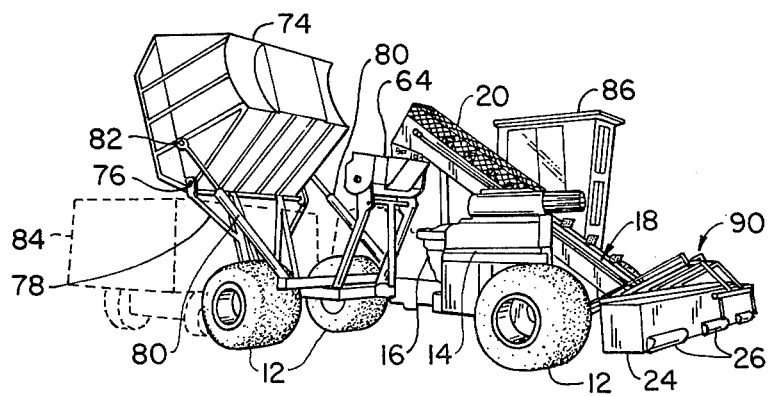
FIG._2.

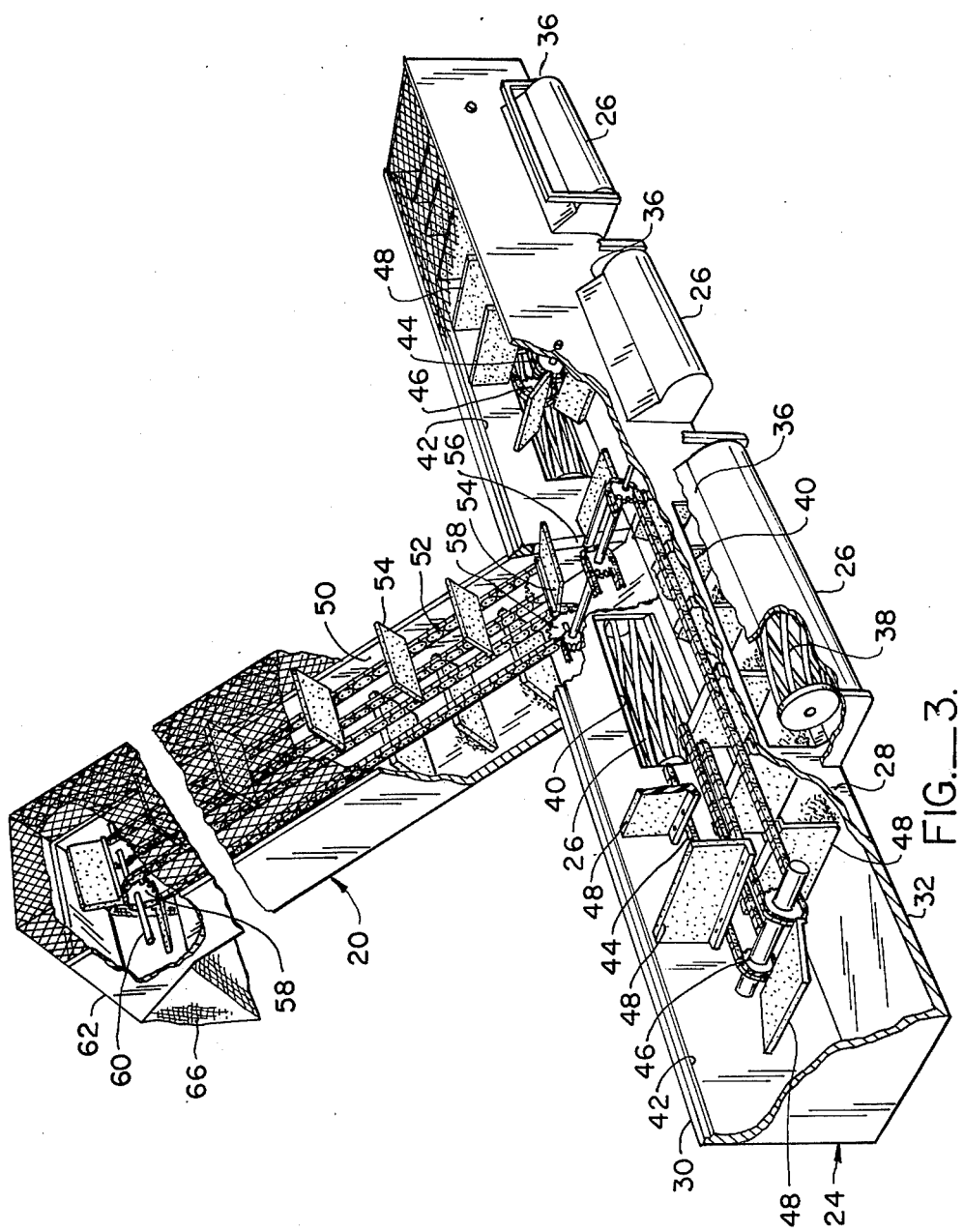
FIG._3.

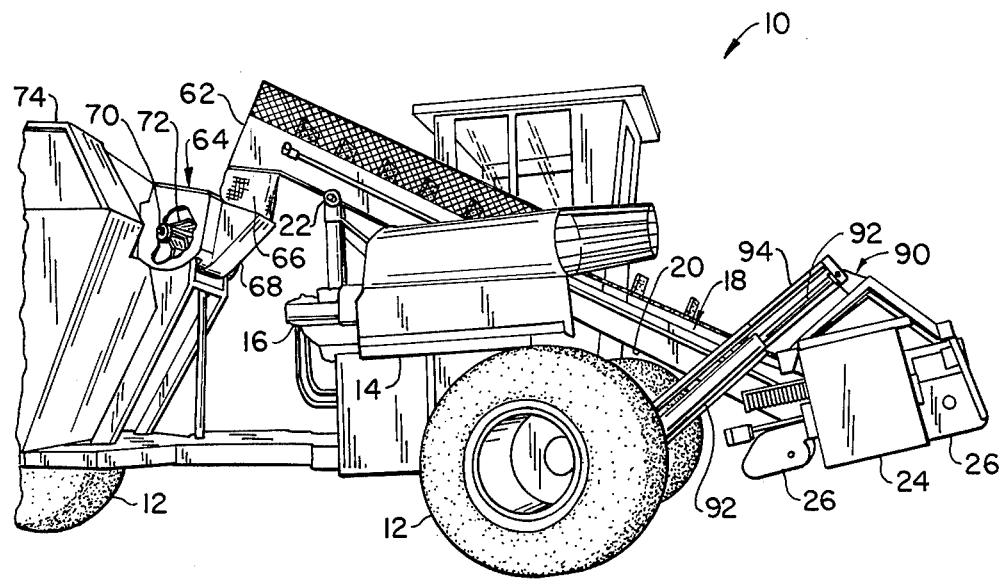
FIG._4.

APPARATUS FOR CUTTING AND COLLECTING GRASS CLIPPINGS

BACKGROUND OF THE INVENTION

1. Field of Invention

This invention relates to a high capacity grass mowing machine and particularly to a grass mowing machine capable of recovering a maximum amount of grass clippings for use as forage.

Turf nurserys having large areas of grass under cultivation yield as a by-product great amounts of grass clippings. Grass clippings have heretofore posed a disposal problem. However, the forage value of grass clippings has been recognized particularly as a feed for poultry.

Grass clipppings as forage presents special handling problems. It has been found that dehydration provides the best method of preservation in preparation for storage and shipping using conventional means.

A major obstacle in developing a practical and economically feasible forage processing system has been a need for an apparatus capable of efficiently harvesting the grass clippings, and in particular what has been needed is an implement suitable for cutting a large amount of grass quickly and with minimal damage to the clippings, thoroughly recovering the clippings from the ground and collecting and depositing collected clippings in a transport vehicle. Moreover, the implement must be simple and reliable enough to be able to operate in widely varying ground conditions (e.g., wet and dry) without damaging the turf while delivering the harvested product in the freshest possible useable condition for further processing.

2. Description of the Prior Art

Harvesting machines having systems for picking up materials on conveyors and delivering them to containers are well-known. However, high volume grass mowing and harvesting apparatus have not been known.

Ganged lawnmowers are known as for example U.S. Pat. No. 3,090,184. Therein, a mower frame is described which is adapted to be attached to a tractor for towing. There is however no means disclosed for recovering all or substantially all of the grass clippings for further processing. U.S. Pat. No. 3,221,483 discloses a lawn cutting implement with gathering means. Therein is disclosed a raking and sweeping implement coupled to a conveyor mechanism and a collecting container. The implement disclosed therein is adapted to be towed by a pulling vehicle such as a tractor.

SUMMARY OF THE INVENTION

In accordance with the invention an apparatus is disclosed for mechanized harvesting of grass clippings which comprises a powered vehicle, a T-shaped hydraulically driven extension platform having a central arm and a lateral arm with a plurality of horizontally disposed reel-type scissor mower heads mounted on the front and rear sides of the lateral arm, the outlets of which are directed into a horizontal trough within the lateral arm. The mower heads are operative to cut the grass and to throw the clippings into the horizontal trough. Within the horizontal trough are provided endless chains on pulleys to which are mounted spaced paddles. The spaced paddles are operative to accumulate the clippings toward a central port into a central trough within the central arm of the extension platform. Within the central trough are provided endless chains and pulleys to which are mounted spaced paddles. The spaced paddles are operative synchronously with the spaced paddles of the horizontal trough to convey accumulated clippings upwardly through a discharge port and a flexible chute to a dispensing bin below the discharge port. Within the dispensing bin are provided paddle blades mounted to a horizontally disposed drive shaft which are operative to shovel clippings from the discharge bin to a hopper. The hopper is mounted on the vehicle frame and has an elevated pivot axle supporting one side of the hopper. Hydraulic cylinders mounted between the frame and the hopper are operative to lift and dump the hopper into an auxiliary transport vehicle.

The extension platform at the front of the apparatus can be remotely raised and lowered around a horizontal pivot shaft adjacent the discharge port. Raising and lowering of the platform is provided through a pair of hydraulic cylinders mounted in parallel to a tilted pair of extensible rails and support cylinders, the cylinders being pivotally connected at one end to the vehicle frame and at the other end to a cradle from which the lateral arm of the platform is suspended. Broad balloon tires are provided on the vehicle so as to minimize the possibility of damage to turf.

An object of the invention is to provide a high capacity grass mowing apparatus capable of recovering a maximum amount of grass clippings in a form suitable for processing for forage. Horizontal blade rotary-type mowers are unsuitable for harvesting grass because the blades typically pulverize the clippings to an undesirable degree such that the clippings are lost or rendered unusable.

A further object of the invention is to provide a high capacity grass mowing machine capable of operating under a wide range of ground conditions without damaging the turf over which the vehicle travels. Large balloon-type tires are provided for this purpose, and an enclosed cab is provided so that the vehicle can also operate under wet weather conditions.

Other objects and advantages of the invention, particularly as they pertain to mechanical details of the mechanism will be apparent upon reference to the following detailed description taken in conjunction with the enclosed drawings.

BRIEF DESCRIPTION OF THE DRAWINGS

FIG. 1 is a perspective view showing an apparatus according to the invention with an extension platform having reel-type mower heads, the extension platform being in a down position.

FIG. 2 is a perspective view showing the apparatus from an opposing side from FIG. 1. A dumping hopper is shown in discharge position.

FIG. 3 is a cutaway perspective view showing the extension platform according to the invention.

FIG. 4 is a side perspective view of the mowing device according to the invention showing the extension platform in a raised position.

DETAILED DESCRIPTION OF PREFERRED EMBODIMENTS

Turning to FIG. 1 there is shown a perspective view illustrating a mowing machine 10 apparatus according to the invention. The machine 10 is a wheeled vehicle having four relatively broad balloon tires 12, and it is driven by a suitable diesel motor 14 or the like, which also drives a hydraulic control system 16. (FIG. 2)

The machine 10 features a T-shaped extension platform 18 for cutting and recovering grass. Referring to FIGS. 1, 2 and 4, the platform 18 features a central arm 20 mounted to a horizontal pivot 22 which is located about centrally between the wheels 12 at an elevated distance above the ground level. The central arm 20 is mounted to the pivot 22 in a manner extending the central arm 20 in front of the front wheels 12.

Attached to the front end of the central arm 20 is a lateral arm 24. The lateral arm 24 supports a plurality of reel-type scissor mower heads 26, as hereinafter explained.

Referring to FIG. 3, the lateral arm 24 has front, rear and bottom walls 28, 30, 32, and the scissor-type mower heads 26 are mounted to the front and rear side walls 28, 30. The scissor-type mower heads 26 are hydraulically driven through hydraulic lines 34 (FIG. 1), and are housed within a cowling 36 which serve both to protect against exposure to moving blades of the reels 38 and to direct cut grass into grass outlets 40 in the sides 28, 30 of the lateral arm 24.

As further shown in FIG. 3, the walls 28, 30, 32 of the lateral arm 24 define a central trough 42. Endless chains 44 are disposed within the central trough 42. The chains may be of the metal link type, and they extend from substantially the ends thereof to a central point. Two chain systems are provided within the lateral arm 24, one for each lateral extension of the lateral arm 24. The endless chains are driven by pulleys 46, mounted to axles extending front to rear across the central trough 42. The pulleys 46 are driven by an appropriate gear mechanism.

Mounted to each of the endless chains 44 is a series of paddles 48. The paddles 48 can be rigid plates which extend the width of trough 42 and substantially the distance thereof from the endless chain 44 to the bottom wall 32. The paddles are spaced on the endless chain 44 at a distance approximately equal to the width of the trough 42 front to back across the lateral arm 24. In operation, the paddles 48 are moved by the endless chain 46 along the bottom of the trough 42 past the outlets 40 to scrape grass clippings thrown by the reels 38 toward a central point.

The central arm 20 similarly comprises a central trough 50 in which is provided a longitudinally disposed endless chain 52 having rigid paddles 54 mounted thereto. The paddles 54 are similarly adapted to mate with the confronting sides of the trough 50. The central arm 20 is mounted with an end opening 56 accessible to the central point of the lateral arm 24. The pulleys 58 to which the endless chain 52 is mounted are adjacent the end opening 56. Consequently the paddles 54 at the end of a circuit can extend into the central area of lateral arm 24. The endless chain 52 is driven at its upper end by drive pulleys 58 which are connected to a drive shaft 60.

In operation, the paddles 54 of the central arm 20 move with the endless chain 52 in a cycle around the pulleys 56 into the central area of lateral arm 24 to collect grass clippings and to convey the grass clippings up the central trough 50 to a discharge end 62. The gearing of the pulleys of the central arm 20 and the lateral arm 24 are such that the paddles 54 and the paddles 48 alternately pass through the central area of the lateral arm 24.

Referring to FIG. 4, the discharge end 62 is provided with a dispensing means 64 which includes a flexible chute 66 coupling the discharge end 62 of the central arm 20 to a dispensing bin 68. A drive shaft 70 extends through the dispensing bin 68, and a plurality of paddle blades 72 are mounted within the dispensing bin 68 to the drive shaft 70. The drive shaft 70 is connected to a drive motor. Mounted adjacent the outlet of the dispensing bin 68 is a hopper 74. Referring to FIG. 2, it can be seen that the hopper 74 is mounted to be tipped for dumping. For this purpose, the hopper 74 is supported on a pivotal axle 76 on elevated posts 78, and is driven by hydraulic cylinders 80 connected between the frame of the machine 10 and a leverage pivot 82 on the side of the hopper 74.

In operation, the dispensing means receives grass clippings from the extension platform 18, and by means of the rotating paddles 72 urges the grass clippings into the hopper 74. After the hopper 74 has received a full load, or the machine 10 has completed its run, the hopper 74 is dumped into a storage vehicle, such as a dump truck or trailer 84 (FIG. 2).

In FIG. 4, in specific embodiments of the invention, the flexible chute 66 may be a flexible mesh enclosure which is fixed to both an opening in the discharge end 62 and an opening in the dispensing bin 64. In operation, when the platform 18 is moved vertically, the chute 66 can flex to a movement about the the pivot 22.

The machine 10 is adapted for all weather operation. For this purpose, an enclosed cab 86 is provided, with adequate window openings on all sides to observe the operation of the machine 10. In particular, a viewing window 88 is provided in the lower front of the enclosed cab 86 for viewing the operation of the lateral arm 24, and particularly the junction of the lateral arm 24 and the central arm 20.

The machine 10 is adapted to work in variety of terrains. For this purpose, there is provided an articulated coupling between the lateral arm 24 and the central arm 20. Referring to FIGS. 1 and 4, the articulated coupling comprises bracket means 90 in the form of a L-shaped cradle which is rigidly attached to the lateral arm 24. The bracket means 90 is pivotally attached to the central arm 20 in a manner such that the lateral arm 24 is suspended by the central arm 20. A hydraulic cylinder and piston mechanism 92 coupled at one end to the frame of the machine 10 and at the other end to the bracket means 90 is operative to raise and lower the platform 18. Additional support for the lateral arm is provided through extensible arms 94 which are mounted adjacent and parallel to the hydraulic pistons and cylinders 92.

In operation, in the down position, the extension arms 94 are fully compressed, the central arm 20 is at its lowest position and most acute angle relative to the ground surface, and the lateral arm 24 rides adjacent ground level. In FIG. 4, the platform 18 is shown in a fully raised position. The central arm 20 is raised to a position approaching parallel with the ground surface, the piston and cylinder 92 and the extension arms 94 are fully extended. Accordingly, the lateral arm 24 is raised above ground level so that the mower heads 26 cannot be engaged.

While the above provides a full and complete disclosure of the preferred embodiments of the invention, various modifications, alternate constructions and equivalents may be employed without departing from the true spirit and scope of the invention. Accordingly, the above description and illustrations should not be construed as limiting the scope of the invention which is defined by the appended claims.

What is claimed is:

1. An apparatus for harvesting grass clippings comprising:
   a motorized vehicle with wheels;
   a T-shaped extension platform for cutting and recovering grass, said platform comprising:
   (a) a central arm;
   (b) means for pivotally mounting said central arm to said vehicle in a manner extending said central arm in front of said wheels;
   (c) a lateral arm disposed at the end of said central arm, said lateral arm having front and rear sides and a substantially horizontally disposed trough with inner front, rear and bottom walls within said lateral arm, a plurality of reel-type scissor mower heads mounted to the outside of said front and rear sides, means defining outlets for discharge of grass clippings from said mower heads into said trough, an endless chain disposed within said trough and mounted on each end on pulleys, paddles mounted to said endless chain and disposed to mate with said inner walls of said trough, means coupled to said pulleys for moving said endless chain such that said paddles are moved past said outlets toward said central arm, and discharge means between said trough and said central arm;
   said central arm comprising a trough longitudinally extending from a first end adjoining said trough in said lateral arm to a second discharge end, an endless chain disposed in said central trough on pulleys adjacent each end of said central trough, paddles mounted to said endless chain and disposed to mate with inner walls of said central trough, and means coupled to said pulleys adjacent the ends of said central trough for moving said endless chain such that said paddles in said central trough are moved from said first end to said second discharge end; and
   (d) dispensing means mounted at said discharge end of said central trough for recovering grass clippings cut by said mower heads and for delivering said grass cuttings cut by said mower heads and collecting said cuttings at a central location.

2. The apparatus as claimed in claim 1 wherein said means for pivotally mounting said central arm further comprises a pivot means mounted adjacent said central arm discharge means and means for remotely raising and lowering said central arm about said pivot means.

3. The apparatus as claimed in claim 2 wherein said extension platform further comprises bracket means rigidly attached to said lateral arm and pivotally attached to said central arm in a manner such that said lateral arm is suspended by said central arm.

4. The apparatus as claimed in claim 3 wherein said raising and lowering means comprises at least one hydraulic cylinder means and at least one support cylinder means mounted in parallel with said hydraulic cylinder means, said support cylinder means including a support piston cooperating with a support cylinder, said hydraulic cylinder means and said support cylinder means being pivotally connected at one end to said vehicle and pivotally connected at the other end to said bracket means.

5. The apparatus as claimed in claim 2 wherein said paddles within said central arm are operative synchrously with said paddles within said lateral arm.

6. The apparatus as claimed in claim 5 wherein said dispensing means further comprises:
   a flexible chute coupling said discharge end of said central arm to a dispensing bin;
   a dispensing bin;
   a plurality of paddle blades mounted to a drive shaft within said dispensing bin for moving grass clippings therein to a hopper;
   means for motivating said dispensing bin paddle blades;
   a hopper for receiving and at least temporarily storing grass clippings; and
   means for dumping said hopper into a conventional receiving vehicle such as a dump truck.

7. The apparatus as claimed in claim 6 wherein said dispensing bin includes a receiving chamber which is displaced laterally above said dispensing bin paddles.

8. The apparatus as claimed in claim 6 wherein said flexible chute is fixedly disposed between said discharge end of said central arm and said receiving chamber in a manner permitting verticle motion of said discharge end relative to said receiving chamber.

9. The apparatus as claimed in claim 2 wherein said vehicle includes an enclosed cab mounted laterally of said central arm behind said lateral arm.

10. The apparatus as claimed in claim 9 wherein said cab includes a viewing window through a front lower wall thereof for viewing at least the junction of said central arm and said lateral arm.

11. The apparatus as claimed in claim 2 wherein said vehicle wheels include balloon tires of sufficient width to permit operation of said vehicle on sod without any substantial damage to the sod under wet weather conditions.

* * * * *